Feb. 28, 1933.    C. T. PFLUEGER    1,899,914
CLICK SPRING FOR FISHING REELS
Filed Feb. 11, 1928
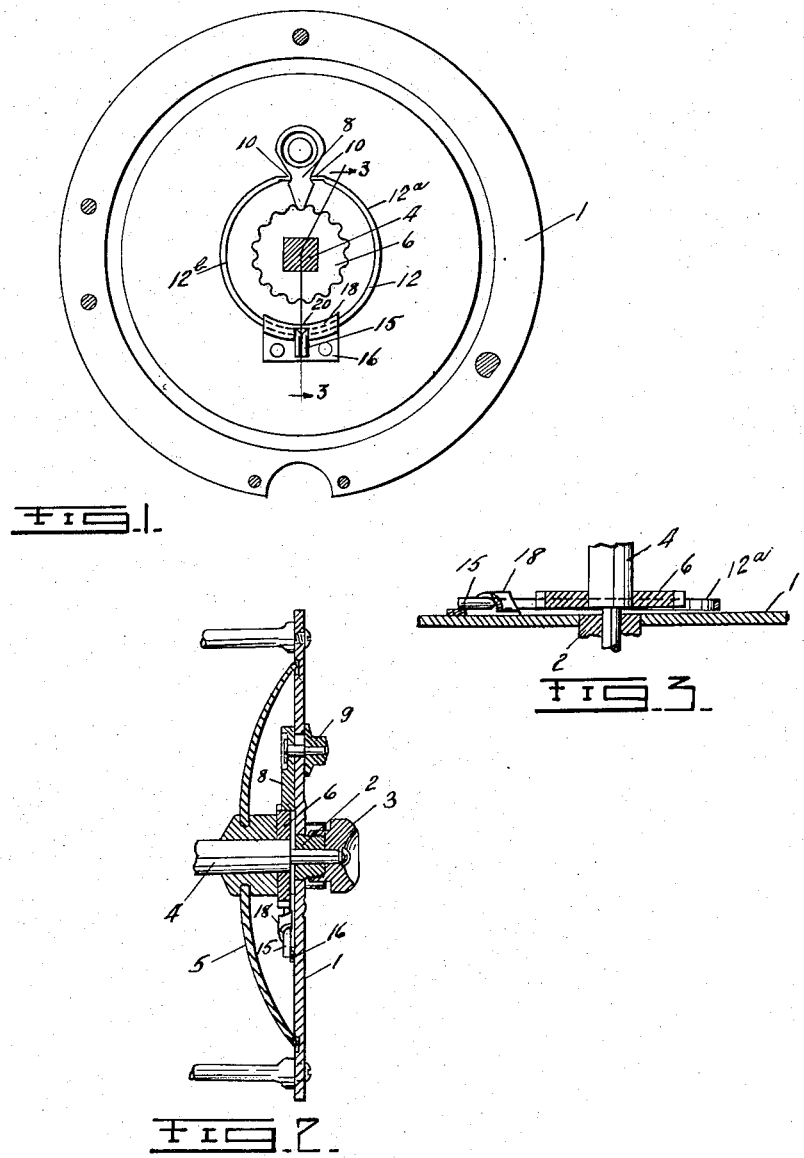
INVENTOR
CHARLES T. PFLUEGER
BY  Ely F Barrow
ATTORNEYS.

Patented Feb. 28, 1933

1,899,914

UNITED STATES PATENT OFFICE

CHARLES T. PFLUEGER, OF AKRON, OHIO, ASSIGNOR TO THE ENTERPRISE MANUFACTURING COMPANY, OF AKRON, OHIO, A CORPORATION OF OHIO

CLICK SPRING FOR FISHING REELS

Application filed February 11, 1928. Serial No. 253,664.

This invention relates to the art of fishing reels and particularly to the click spring mechanism, it being the purpose of the invention to improve upon the construction of click springs securing beneficial results not heretofore accomplished. The objects of the invention are to reduce the cost of manufacture and application of click springs to fishing reels and to secure new and useful results in operation.

In the manufacture of fishing reels, the formation and application of click springs, particularly wire springs, is one of the most delicate and expensive of the various manufacturing problems encountered. A click spring is secured to a reel head as a manual operation requiring niceties of adjustment and handling. One of the principal difficulties encountered is the adjustment of the spring so as to obtain equal pressure at all times on both sides of the click pawl. Crystallization of the click spring, due to rigid attachment to the end plate of the reel, is one of the major difficulties in the success of a click spring, frequent breakage occurring at the base or point of attachment of the spring. There is also a tendency of the usual click spring to be disengaged from the pawl.

The present invention obviates the objections noted above, affording an inexpensive construction of click spring which may be easily assembled and will give equal pressure on both sides of the pawl. The mounting of the spring is non-rigid at the base and permits vibration about the entire spring so that crystallization at the point of attachment is greatly reduced. In addition, the arrangement is such that the points of the springs are maintained in contact with the click pawl at all times.

It will be appreciated that, while the invention is shown and described in considerable detail, changes and modifications may be made in specific embodiments thereof, the scope of the invention not being limited to exact conformity with the showing contained herein.

In the drawing, only that portion of the reel is shown which is directly associated with and a part of the click mechanism, as the balance of the reel may be of any well known or preferred construction.

Figure 1 is a plan view of the end plate of a reel with the improved form of click spring mounted thereon;

Figure 2 is a section through the end plate; and

Figure 3 is an enlarged section on the line 3—3 of Figure 1.

The end plate of the fishing reel is shown at 1, being of the usual form and having a bushing 2 secured therein, in which is mounted a thrust bearing 3 for the shaft 4 of the rotary spool 5. To the shaft near the end plate is secured the usual click pinion 6 with which is arranged to cooperate the click pawl 8 mounted for adjustment into and out of engagement with the click pinion by the adjustable button 9. The sides of the pawl are recessed as at 10 for the reception of the ends of the click mechanism.

The click spring of the present invention is made in two parts $12^a$ and $12^b$, identical in construction. Each of these springs is formed of high carbon piano wire which is pressed into shape on an ordinary press and is flattened or thinned somewhat as shown in Figure 3. By making the spring in two semicircular halves, it is possible to shape them in a press operation which cannot be done when the spring is circular. It is also possible to use a higher grade wire and to form the wire with the flattened sides, which holds its shape better than if the wire were circular in cross-section. It is also possible to make the two spring sections of equal strength and resilience so that the pressures on opposite sides of the click pawl are accurately balanced although the two sections may be made of different strengths, if it be desired to secure greater resistance in one direction than the other. The ends of the spring adjacent the pawl are drawn out slightly to form reduced extremities to enter the notches 10. The opposite ends of the spring sections are formed with radially extending tail pieces or extensions 15 which are placed in contact when the spring is mounted.

The spring halves are held in position by a clip or plate 16 riveted to the end plate and provided with a curved, upwardly arched gutter or flange 18, the center of which is notched as at 20 to permit the passage of the extensions 15. When the clip and the springs are assembled on the end plate, the springs are held in position, each spring half bearing against and balancing the other spring half. At the same time there is slight play allowed between the flange 18 and the spring halves so that the springs are not rigidly held in position at the point where they enter the gutter, but may vibrate slightly, and an abrupt dead spot is avoided. This construction obviates crystallization of the springs at the point of attachment and increases the life of the spring.

At the same time it will be observed that the rear ends of the springs are elevated above the end plate where they rest upon the upper surface of the clip, which tends to throw their front ends downwardly and to keep them in engagement with the pawl 8. The extensions prevent shifting or rotation of the spring in the clip.

It will have been noted that even pressure upon the two sides of the click pawl is obtained, the springs are given longer life and great utility and are maintained in proper relationship to the click pawl. Other advantages may be noted. The scope of the claims is intended to cover such advantages and features of construction as are new and patentable over the prior art.

What is claimed is:

1. A spring for click pawls of fishing reels, comprising two similar spring members and having opposed ends engaging the click pawl, the other ends being secured to the reel and having outwardly turned radial extensions in contact with one another.

2. A spring device for click pawls of fishing reels, comprising spring halves, each having ends to engage the pawl and opposite ends with extensions thereon, said extensions being in contact, and means to anchor the spring on the reel, said means comprising a clip attached to the reel and having a gutter to enclose a portion of each spring half and a recess to receive the extensions.

3. A click spring device for fishing reels, comprising a spring, an elevated clip securing the spring in position on the reel, said clip having a gutter to house the spring but to permit slight vibration therein and means comprising an extension on the spring received in a recess in the clip to prevent the spring from rotation or shifting in the gutter.

4. A fishing reel comprising an end plate, a click pawl mounted in the end plate, and a click spring in contact with the pawl, the plane of the spring being inclined with respect to the end plate the end of the spring remote from the pawl being elevated above the end plate.

5. A fishing reel comprising an end plate, a click pawl mounted in the end plate and a click spring, said spring comprising two spring halves, opposing ends of said halves being in contact with the pawl, the other ends being in contact with one another and elevated above the end plate.

6. A fishing reel comprising an end plate, a click pawl mounted in the end plate and a click spring, said spring comprising two semi-circular spring halves, opposing ends of said halves being in contact with the pawl, the other ends having extensions in contact with one another and elevated above the end plate.

7. A fishing reel comprising an end plate, a click pawl mounted in the end plate and a click spring, said spring comprising two spring halves flattened in cross-section, opposing ends of said halves being in contact with one another and elevated above the end plate.

8. A fishing reel comprising an end plate, a click pawl mounted in the end plate and a click spring, said spring comprising two semi-circular spring halves flattened in cross-section, opposing ends of said halves being in contact with the pawl, the other ends having extensions in contact with one another and elevated above the click plate.

9. A click spring composed of two independent wire sections having radial extensions in contact at one end.

10. A click spring composed of two independent wire sections having outwardly turned radial extensions in contact at one end and a clip for securing the sections to a reel structure.

CHARLES T. PFLUEGER.